(12) United States Patent
Choi

(10) Patent No.: US 6,191,835 B1
(45) Date of Patent: Feb. 20, 2001

(54) THIN FILM TRANSISTOR LIQUID CRYSTAL DISPLAY AND METHOD FOR MANUFACTURING THE SAME

(75) Inventor: Woo Ho Choi, Seoul (KR)

(73) Assignee: Hyundai Electronics Industries Co., Ltd., Ich'on (KR)

( * ) Notice: Under 35 U.S.C. 154(b), the term of this patent shall be extended for 0 days.

(21) Appl. No.: 09/061,049

(22) Filed: Apr. 16, 1998

(30) Foreign Application Priority Data

Apr. 18, 1997 (KR) ................................. 97-14495

(51) Int. Cl.$^7$ .................. G02F 1/1335; G02F 1/136; G02F 1/1333
(52) U.S. Cl. ................ 349/106; 349/43; 349/110; 349/138
(58) Field of Search ................ 349/42, 43, 106, 349/110, 187, 138

(56) References Cited

U.S. PATENT DOCUMENTS

| | | | |
|---|---|---|---|
| 5,499,124 | 3/1996 | Vu et al. ................................. | 349/42 |
| 5,933,208 | * 8/1999 | Kim ........................................ | 349/106 |
| 5,943,107 | * 8/1999 | Kadota et al. ......................... | 349/106 |
| 6,008,872 | * 12/1999 | den Boer et al. ...................... | 349/106 |
| 6,118,505 | * 9/2000 | Nagata et al. ......................... | 349/106 |

FOREIGN PATENT DOCUMENTS

| | | |
|---|---|---|
| 64-3604 | 1/1989 | (JP) . |
| 3-85529 | 4/1991 | (JP) . |
| 5-72561 | 3/1993 | (JP) . |

* cited by examiner

*Primary Examiner*—William L. Sikes
*Assistant Examiner*—Toan Ton
(74) *Attorney, Agent, or Firm*—Jacobson, Price, Holman & Stern, PLLC

(57) ABSTRACT

A color filter layer covering both a thin film transistor and a pixel electrode which are formed on a lower substrate. A portion of the color filter layer positioned on the thin film transistor serves a protection layer of the thin film transistor and the other portion of the color filter layer serves a conventional color filter layer which were conventionally formed on an upper substrate opposite to the lower substrate. Therefore, the process number for the LCD is decreased and thus the manufacturing cost of the LCD is reduced.

20 Claims, 4 Drawing Sheets

THIN FILM TRANSISTOR LIQUID CRYSTAL DISPLAY AND METHOD FOR MANUFACTURING THE SAME

BACKGROUND OF THE INVENTION

1. Field of the Invention

The present invention is directed to a technique of a liquid crystal display, and more particularly to a thin film transistor liquid crystal display having an improved hue and a simple process thereof and a method for manufacturing the same.

2. Description of the Related Art

In general, a thin film transistor liquid crystal display includes a lower substrate, a thin film transistor, as a switching device, formed on the lower substrate, an upper substrate opposite to the lower substrate, a color filter of red, green and blue formed on the upper substrate and a liquid crystal sealed within a cavity defined by both substrates.

FIG. 1 is a view showing a cross sectional view of the conventional thin film transistor liquid crystal display(TFT LCD).

On a portion of a lower substrate 1 an etch stopper inverse staggered type thin film transistor 15 (E/S inverse staggered TFT) and on the other portion of the lower substrate 1 a pixel electrode 8 is disposed. The pixel electrode is of ITO. A passivation layer 9 for protecting the E/S inverse staggered TFT 15 is arranged on the E/S inverse staggered TFT 15. The TFT 15 has a gate 2a, a source 7a and a drain 7b. A storage electrode 2b on the same plane as the gate 2a, the pixel electrode 8 and a insulating layer 3 interposed between the storage electrode 2b and the pixel electrode 8, form a capacitor 17. On a portion of the upper substrate 11 is disposed a black matrix 12 for preventing a cross talk of the liquid crystal display. The black matrix 12 is formed on a portion of the upper substrate corresponding to the TFT 15 and the capacitor 17. On another portion of the upper substrate which corresponds to the pixel electrode, the color filter layer 13 of red, green and blue is disposed. A common electrode 14 is arranged on the black matrix 12 and the color filter 13. The common electrode 14 is of ITO. A numeral 4 indicates an active region, a numeral 5 indicates an etch stopper and a numeral 6 indicates an ohmic resistance contact layer.

In order to manufacture such TFT LCD, in one production line, the TFT 15 is formed on the portion of the lower substrate 1. During the formation of the TFT 15 before forming the source 7a and the drain 7b, the pixel electrode 8 is formed on the other portion of the lower substrate 1. Thereafter, the passivation layer 9, for protecting the TFT 15 is formed thereon. On the other hand, in another production line, the black matrix 12 is formed on a portion of the upper substrate 11 corresponding to the TFT 15 and the capacitor 17. The color filter layer 13 is formed on another portion of the upper substrate 11 corresponding to the pixel electrode 8. Then the common electrode 14 is formed over the resultant in which the black matrix 12 and the color filter 13 are provided.

According to the above described manufacturing method, a process for the passivation layer 9 is independently carried out from a process for the color filter layer 13. Accordingly, the process for the LCD is considered complicate.

In addition, two production lies are required so as to make the TFT LCD; one line for formation of both the TFT 15 and the passivation layer 9 on the lower substrate 1 and the other line for formation of the color filter layer 13 on the upper substrate 11. An investment cost on a setting-up of additional production line is much high.

SUMMARY OF THE INVENTION

An object of the present invention is to simplify a manufacturing process of a liquid crystal display.

In a view of a present invention, the liquid crystal display has a first substrate, a switching device formed on a portion of an opposing surface of the first substrate, a color filter layer formed on the entire opposing surface of the first substrate provided with the switching device and a first electrode formed on the color filter layer positioned on the other portion of the opposing surface of the first substrate and electrically connected to the switching device. In addition, the liquid crystal display further includes a second substrate opposite to the first substrate, a black matrix formed on a portion of an opposing surface of the second substrate corresponding to the switching device and a second electrode formed on the entire opposing surface of the second substrate provided with the black matrix. Among the color filter layer a portion over the switching device serves a protection layer of the switching device.

In another view of a present invention, in order to manufacture a liquid crystal display, a first substrate and a second substrate are prepared. The switching device is formed on a portion of an opposing surface of the first substrate. The color filter layer is formed on the entire opposing surface of the first substrate with the switching device. After formation of the color filter layer, a contact hole is made in the color filter layer to expose a portion of the switching device. So as to electrically connect to the switching device and a first electrode, the first electrode is formed on the color filter layer including the contact hole. On the other hand, a black matrix is formed on a portion of an opposing surface of the second substrate corresponding to the switching device and then a second electrode is formed on the entire opposing surface of the second substrate with the black matrix. Here, among the color filter layer, a portion over the switching device is for protecting the switching device.

In a specific case, the first electrode is a pixel electrode, the second electrode is a common electrode, the first substrate is a lower substrate and the second substrate is a upper substrate. The switching device is of an etch stopper inverse staggered type TFT. The thickness of the color filter layer is substantially 1 to 3 $\mu$m in thickness.

A process for a passivation layer, a protection layer of a switching device, is simultaneously carried out with a process for a color filter layer. So, the total process number for LCD is decreased in comparison with the conventional art and then the process for the LCD is more simple. Further, since the switching device and the color filter layer are formed in the same production line, no separate production line for the color filter layer is required. Therefore, we can reduce the investment cost for setting-up the production line.

On the other hand, owing to the color filter layer formed on the lower substrate, an incident light from a backlight is successively transmitted through the color filter layer and the liquid crystal layer and therefore an improvement of the hue can be obtained.

BRIEF DESCRIPTION OF THE DRAWINGS

While the specification concludes with claims particularly pointing out and distinctly claiming that which is regarded as the present invention, details of the embodiment of the present invention may be more readily ascertained from the following technical description when read in conjunction with the accompanying drawings wherein:

DETAILED DESCRIPTION OF THE PRESENT INVENTION

Figure 1:
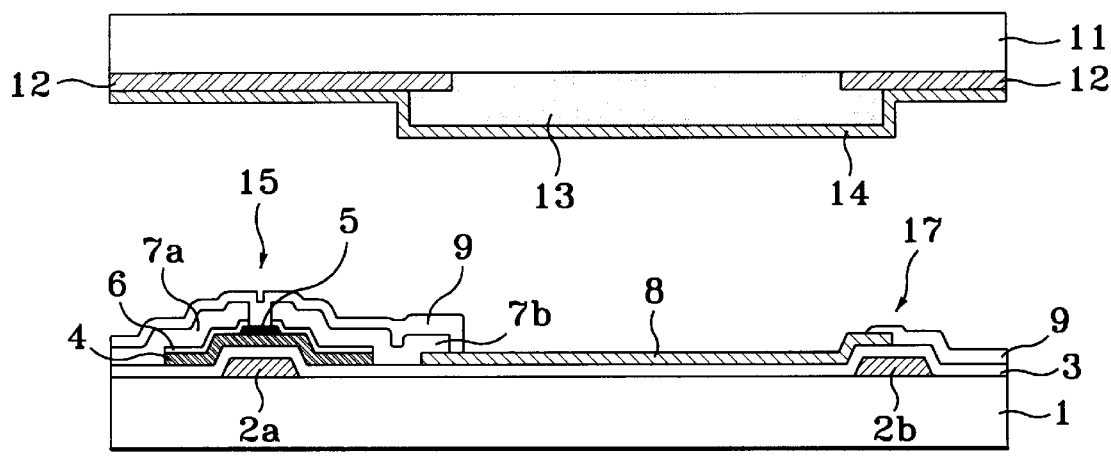
FIG. 1 is a view showing a cross sectional view of a liquid crystal display produced in accordance with a conventional technique.
Figure 2:
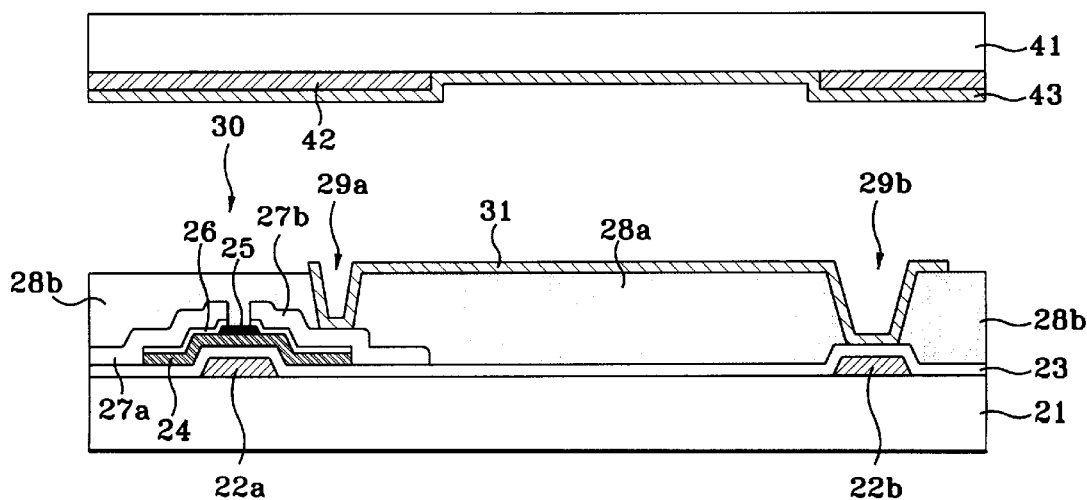
FIG. 2 is a view showing a cross sectional view of a liquid crystal display produced in accordance with a spirit of a present invention.

FIG. 2 illustrates a cross sectional view of a liquid crystal display according to a spirit of a present invention. On a portion of a lower substrate 21 an etch stopper inverse staggered type TFT 30, a switching device, is disposed. A storage electrode 22b is arranged on the same plane as a gate 22a of the TFT 30 and separated therefrom. Color filter layers 28a, 28b are arranged on the entire surface of the lower substrate 21 having the TFT 30. The color filter layer 28b covering the TFT 30 corresponds to the passivation layer 9 of FIG. 1, protecting the TFT 30 from an outside contamination. The color filter layers 28a and 28b have contact holes 29a and 29b, thereby exposing a drain 27b of the TFT 30 and an insulating layer 23 positioned on the storage electrode 22b. The pixel electrode 31 is disposed on the color filter layer 28a including the contact holes 29a and 29b. The pixel electrode 31 is made of ITO. The pixel electrode 31 on the bottom surface of the contact hole 29b, the storage electrode 22b and the insulating layer 23 construct a capacitor. A numeral 24 symbolizes an active region, a numeral 25 stands for an etch stopper, a numeral 26 stands for a omhic resistance contact layer and a numeral 27a stands for a source of the TFT 30.

The black matrix 42 is disposed on a portion of the upper substrate 41 corresponding to the TFT 30 and the capacitor. The common electrode 43 is arranged on the entire surface of the upper substrate 41 provided with the black matrix 42, and is made of ITO.

With reference to FIGS. 3A, 3B, 3C, 3D, 3E and 3F, the method for manufacturing the TFT, the color filter and the pixel electrode all on the lower substrate.

Figure 3A:
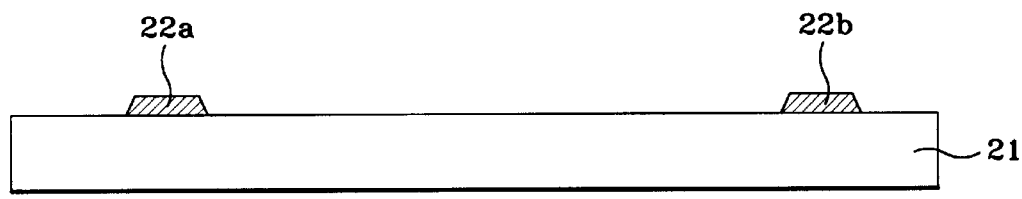
FIGS. 3A, 3B, 3C, 3D, 3E and 3F are views illustrating a manufacturing method for elements formed on the lower substrate of the liquid crystal display in FIG. 2.

In FIG. 3A, the lower substrate 21 is prepared. One etal selected from MoTa, MoW and Cr is sputter deposited in about 2000 to 3000 Å, on the entire surface of the lower substrate 21 and patterned by known a photolithography manner, thereby forming a gate 22a and a storage electrode 22b.

Figure 3B:
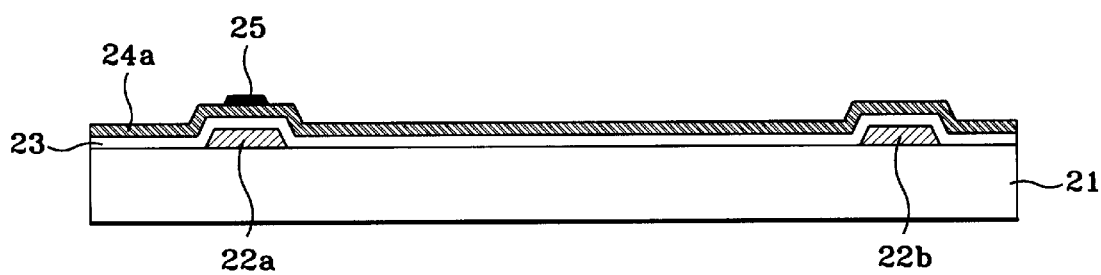

In FIG. 3B, on the entire surface of the lower substrate 21 provided with the gate 22a and the storage electrode 22b, an insulating layer 23 of about 3000 Å, an amorphous silicon layer 24a of about 5000 Å and a silicon nitride layer of about 2000 Å are successively deposited. Thereafter, the silicon nitride layer is patterned using an etch stopper mask(not shown), forming an etch stopper 25.

Figure 3C:
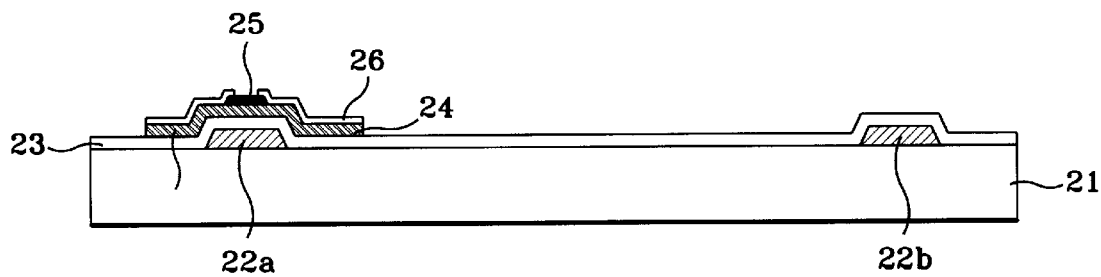
Figure 3D:
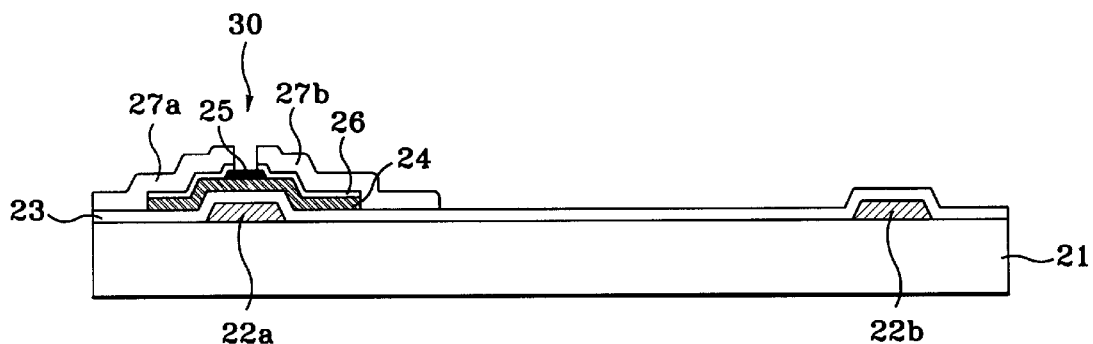

In FIG. 3C, in order to form an ohmic resistance contact layer, an amorphous silicon doped with an impurity, for example phosphour, is deposited on the entire surface of the lower substrate 21 with the etch stopper 25. For defining a region of the TFT, the impurity doped amorphous silicon layer and the amorphous silicon layer 24a both are patterned, forming the ohmic resistance contact layer 26 and the active layer 24, respectively.

Next, is formed a pad therethrough an external power for driving the TFT is supplied, which is not shown. Thereafter, in FIG. 3D, a metal for a source and a drain is deposited on the entire surface of lower substrate 21, and then patterned to form a source 27a and a drain 27b, completing the TFT 30.

Figure 3E:
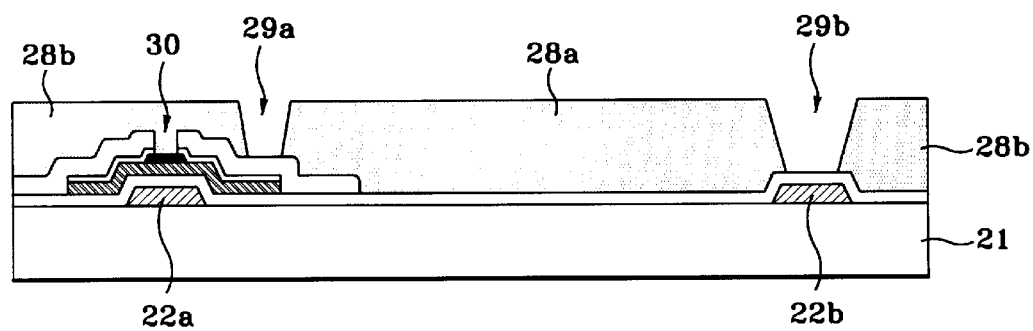

In FIG. 3E, a red color filter resin is coated on the entire surface of the lower substrate 21 having the TFT 30. A portion of the coated red color filter resin is etched to form contact holes 29a, 29b. The first contact hole 29a exposes the drain 27b of the TFT 30 while the second contact hole 29b exposes the insulating layer 23 on the storage electrode 22b. The red color filter resin 28b coated on the TFT 30 corresponds to the passivation layer 9 in FIG. 1 and protects the TFT 30. On the other hand, the red color filter resin 28a between the TFT 30 and the storage electrode 22b serves the conventional red color filter layer. The color filter resins 28a, 28b are of photosensitive film in about 1 to 3 μm in thickness. The above description can be obviously applied for an explanation on a green color filter layer and a blue color filter layer by those skilled in the art pertinent to the present invention.

Figure 3F:
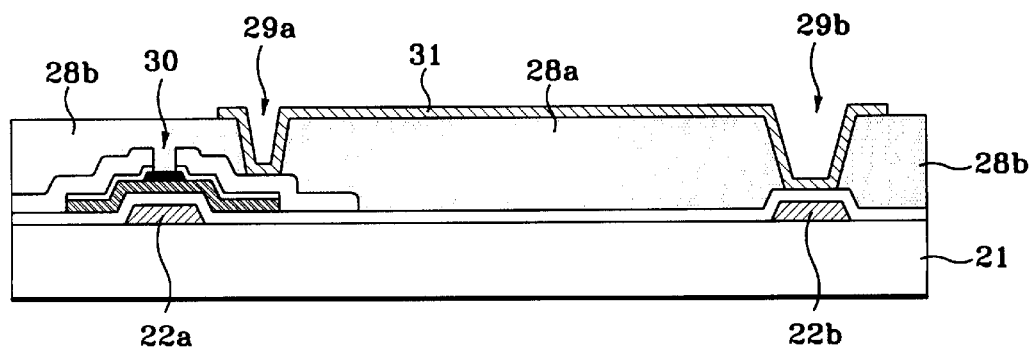

In FIG. 3F, finally, the pixel electrode 31 is formed on the entire surface of the red color filter layer 28a including the first contact hole 29a and the second contact hole 29b. The pixel electrode 31 is made of ITO. The pixel electrode on the bottom surface of the second contact hole 29b, the storage electrode 22b and the insulating layer 23 are constitutes a capacitor.

Figure 4A:
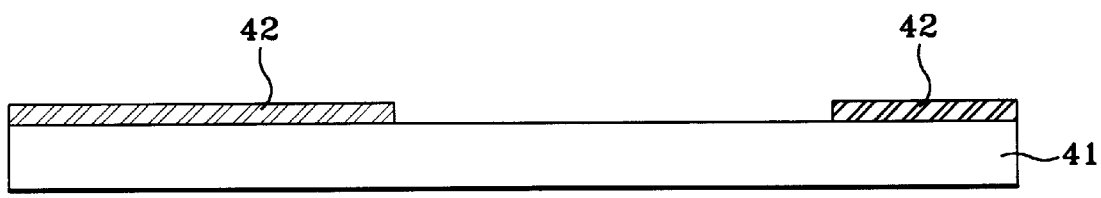
FIG. 4A and FIG. 4B are views illustrating a manufacturing method for elements formed on the upper substrate of the liquid crystal display in FIG. 2.
Figure 4B:
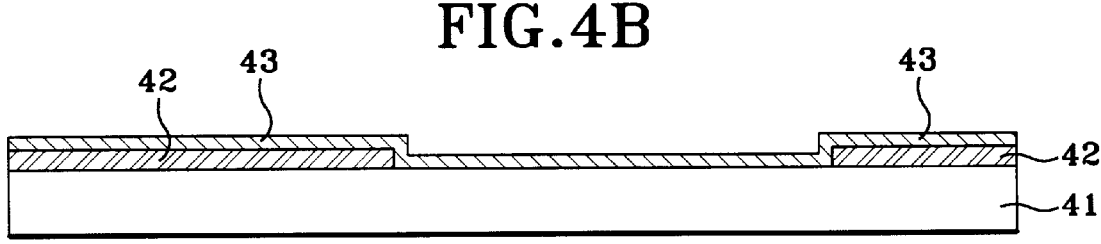

With reference to FIGS. 4A and 4B, the method for manufacturing a black matrix and a common electrode on an upper substrate.

In FIG. 4A, Cr is deposited on the entire surface of an upper substrate 41 in about 2000 Å and then patterned, thereby forming a black matrix 42 among the upper substrate on a portion corresponding to the TFT 30 and the capacitor.

In FIG. 4B, on the entire surface of the upper substrate 41 provided with the black matrix 42 is formed a common electrode 43. The common electrode is made of ITO.

As described above, the color filter resin is coated on the entire surface of the lower substrate provided with the TFT 30, so one portion of the color filter resin which covers the TFT 30 serves a protection layer of the TFT 30 and the other portion of the color filter resin on which the pixel electrode 31 will be formed serves the conventional color filter layer. That is, a process for the color filter layer and a process for the passivation layer (or protection layer) are simultaneously performed. Accordingly, the process number for the LCD is decreased and thus the manufacturing cost of the LCD is reduced.

In addition, since both the TFT 30 and the color filter layers 28a and 28b are formed on the lower substrate, no separated production line is required and thus the investment cost of setting up production line for the LCD is also reduced. Further, an incident light from a backlight is successively transmitted through a color filter and a liquid crystal which is interposed between the lower substrate 21 and the upper substrate 41 and therefore the hue of the LCD is improved.

Though only etch stopper inverse staggered type TFT is disclosed in the present invention, the present invention is not limited thereby. The present invention is obviously applied for the LCD employing an etch back inverse staggered type TFT, a staggered type TFT, a coplanar type TFT or self-aligned type TFT.

While the present invention has been particularly shown and described with reference to particular embodiments thereof, it will be understood by those skilled in the art that various changes in form and details may be effected therein without departing from the spirit and scope of the prevent invention as defined by the appended claims.

What is claimed is:

1. A liquid crystal display comprising:
   a first substrate;
   a second substrate opposite to said first substrate;
   a switching device formed on a portion of an opposing surface of said first substrate;
   a color filter layer formed on the entire opposing surface of said first substrate provided with said switching device;
   a first electrode formed on the color filter layer positioned on the other portion of the opposing surface of said first substrate and electrically connected to said switching device;
   a black matrix formed on a portion of an opposing surface of said second substrate corresponding to said switching device; and
   a second electrode formed on the entire opposing surface of said second substrate provided with said black matrix.

2. The liquid crystal display according to claim 1, wherein said first electrode is a pixel electrode, said second electrode is a common electrode, said first substrate is a lower substrate and said second substrate is an upper electrode.

3. The liquid crystal display according to claim 1, wherein a portion of said color filter layer positioned on said switching device is a protection layer of said switching device.

4. The liquid crystal display according to claim 1, wherein said switching device is an etch stopper inverse staggered type thin film transistor.

5. The liquid crystal display according to claim 2, wherein a portion of said color filter layer positioned on said switching device is a protection layer of said switching device.

6. The liquid crystal display according to claim 2, wherein said switching device is an etch stopper inverse staggered type thin film transistor.

7. The liquid crystal display according to claim 1, wherein said color filter layer has about 1 to 3 $\mu$m in thickness.

8. A liquid crystal display comprising:
   a lower substrate;
   an upper substrate opposite to said lower substrate; an etch stopper inverse staggered type thin film transistor formed on a portion of an opposing surface of said lower substrate;
   a color filter layer formed on the entire opposing surface of said lower substrate provided with said etch stopper inverse staggered type thin film transistor;
   a pixel electrode formed on said color filter layer positioned on the other portion of an opposing surface of said lower substrate and electrically connected to said etch stopper inverse staggered type thin film transistor;
   a black matrix formed on a portion of an opposing surface of said upper substrate corresponding to said etch stopper inverse staggered type thin film transistor; and
   a common electrode formed on the entire opposing surface of said upper substrate provided with said black matrix.

9. The liquid crystal display according to claim 8, wherein a portion of said color filter layer positioned on said etch stopper inverse staggered type thin film transistor is a protection layer of said etch stopper inverse staggered thin film transistor.

10. The liquid crystal display according to claim 8, wherein said color filter layer has about 1 to 3 $\mu$m in thickness.

11. A method for manufacturing a liquid crystal display comprising the steps of:
    preparing a first substrate and a second substrate; forming a switching device on a portion of an opposing surface of said first substrate;
    forming a color filter layer on the entire opposing surface of said first substrate provided with said switching device;
    forming a contact hole at a portion of said color filter layer so as to expose to a portion of said switching device;
    forming a first electrode on a portion of said color filter layer including said contact hole, in order to electrically connect said switching device to said first electrode;
    forming a black matrix on a portion of an opposing surface of said second substrate corresponding to said switching device; and
    forming a second electrode on the entire opposing surface of said second substrate provided with said black matrix.

12. The method according to claim 11, wherein said first electrode is a pixel electrode, said second electrode is a common electrode, said first substrate is a lower substrate and said second substrate is an upper electrode.

13. The method according to claim 11, wherein a portion of said color filter layer positioned on said switching device is a protection layer of said switching device.

14. The method according to claim 11, wherein said switching device is an etch stopper inverse staggered type thin film transistor.

15. The method according to claim 12, wherein a portion of said color filter layer positioned on said switching device is a protection layer of said switching device.

16. The method according to claim 12, wherein said switching device is an etch stopper inverse staggered type thin film transistor.

17. The method according to claim 11, wherein said color filter layer has about 1 to 3 $\mu$m in thickness.

18. A method for manufacturing a liquid crystal display comprising the steps of:
    preparing a lower substrate and an upper substrate; forming an etch stopper inverse staggered type thin film transistor on a portion of an opposing surface of said lower substrate;
    forming a color filter layer on the entire opposing surface of said lower substrate provided with said etch stopper inverse staggered type thin film transistor;
    forming a pixel electrode on a portion of an opposing surface of said color filter layer, said pixel electrode electrically connected to said etch stopper inverse staggered type thin film transistor;
    forming a black matrix on a portion of an opposing surface of said upper substrate corresponding to said etch stopper inverse staggered type thin film transistor; and
    forming a common electrode on the entire opposing surface of said upper substrate provided with said black matrix.

19. The method according to claim 18, wherein a portion of said color filter layer positioned on said etch stopper inverse staggered type thin film transistor is a protection layer of said etch stopper inverse staggered thin film transistor.

20. The method according to claim 18, wherein said color filter layer has about 1 to 3 $\mu$m in thickness.

* * * * *